United States Patent [19]
Barbier

[11] 4,425,767
[45] Jan. 17, 1984

[54] REFRIGERATION CONTROL SYSTEM FOR MODULATING ELECTRICALLY-OPERATED EXPANSION VALVES

[75] Inventor: William J. Barbier, St. Louis, Mo.

[73] Assignee: Sporlan Valve Company, St. Louis, Mo.

[21] Appl. No.: 405,033

[22] Filed: Aug. 4, 1982

Related U.S. Application Data

[60] Division of Ser. No. 80,398, Oct. 1, 1979, Pat. No. 4,362,027, which is a continuation-in-part of Ser. No. 865,903, Dec. 30, 1977, abandoned.

[51] Int. Cl.³ .................. F25B 41/00; F16K 15/00
[52] U.S. Cl. .................. 62/212; 137/513.5; 236/75; 251/129
[58] Field of Search .......... 62/225, 212, 224; 236/75; 137/513.5; 251/129

[56] References Cited

U.S. PATENT DOCUMENTS

| | | | |
|---|---|---|---|
| 2,583,178 | 1/1952 | Huntington | 62/223 |
| 2,943,643 | 7/1960 | Pinter et al. | 137/513.5 X |
| 3,577,743 | 5/1971 | Long | 62/212 |
| 4,085,921 | 4/1978 | Veda et al. | 251/129 |

*Primary Examiner*—William E. Wayner
*Attorney, Agent, or Firm*—Cohn, Powell & Hind

[57] ABSTRACT

A refrigeration control system for modulating an electrically-operated expansion valve in which a modulating, electrically-operated expansion valve is connected to the evaporator inlet, and first and second condition-responsive electrical sensors are positioned to respond to conditions at selected location in the system. An electrical amplifier circuit connects the condition-responsive electrical sensors to the valve for regulating the opening and closing of the valve in response to differences in the conditions sensed by the sensors. Refrigerant is fed to at least one of the sensors so as to cause modulation of the expansion valve. More particularly, the condition-responsive sensors are temperature-responsive, the first sensor being positioned to respond to the temperature of the liquid refrigerant expanded to suction pressure, and the second sensor being positioned to respond to suction line sensible temperature. The valve will then modulate to control superheat in response to the differences in the temperatures sensed by the sensors.

9 Claims, 8 Drawing Figures

REFRIGERATION CONTROL SYSTEM FOR MODULATING ELECTRICALLY-OPERATED EXPANSION VALVES

CROSS REFERENCE TO OTHER APPLICATIONS

This application is a division of Ser. No. 06/080,398 filed Oct. 1, 1979, now U.S. Pat. No. 4,362,027, which is a continuation-in-part of Ser. No. 05/865,903 filed Dec. 30, 1977, now abandoned.

BACKGROUND OF THE INVENTION

This invention relates generally to a control system for modulating electrically-operated expansion valves.

The type of refrigeration system where this invention would be applied would generally include a compressor, a condensor, an expansion device and an evaporator. The expansion device controls the flow of liquid refrigerant to the evaporator in response to a control system.

Efficient use of the evaporator surface in a refrigeration system requires that the expansion device provide liquid refrigerant to the evaporator in proportion to the requirement for cooling. To protect the compressor from "liquid slugging", excess flow of liquid must be avoided. To insure that liquid refrigerant does not leave the evaporator, the degrees above the boiling point temperature, generally called superheat, must be controlled. Heretofore, superheat has been controlled by approximation with a fixed restriction or by a mechanical valve powered by a temperature sensitive modulating diaphragm operator such as shown in U.S. Pat. No. 3,742,722, or by electrically operated expansion valves, both modulating and non-modulating in operation. U.S. Pat. No. 3,537,272 discloses a superheat control system for an electrically operated expansion valve for non-modulating operation.

SUMMARY OF THE INVENTION

An electrically-operated valve capable of modulation is an improvement over previous types in that it can provide more functions than a mechanical valve or a solenoid-operated magnetic expansion valve that opens and closes. For example, it can be constructed to provide both superheat control, and provide liquid line stop valve functions, thereby eliminating the need for a liquid line solenoid valve.

Also, the same control circuit which senses superheat could also cause response of the electric expansion valve to other important refrigeration system variables such as: maximum suction pressure, evaporator discharge air temperature, compressor discharge gas temperature and compressor power draw.

The present refrigeration control system regulates the superheat of the suction gas in a refrigeration system by modulating an electrically-operated expansion valve. In one embodiment, the control system includes a condition-sensing system that will cause the electric expansion valve to feed during system start-up. It will measure and control suction line superheat by the use of two sensors mounted on the outside surface of the system piping. It will measure and limit the suction saturation temperature on start-up, thereby providing the function of limiting maximum operating pressure going to the compressor. Depending upon the type of electric expansion valve construction, the valve will close and function as a shut-off valve when the system power is off to provide rapid pressure equalization between the high side and low side of the system.

The present refrigeration system control can utilize any electric expansion valve that is capable of some form of modulation, i.e., electromagnetic operators and heat motor operators. For example, in the preferred embodiments, the refrigeration system control utilizes an electromagnetic operator similar to that disclosed in U.S. Pat. No. 3,914,952.

The refrigeration control system includes a modulating, electrically-operated expansion valve connected to the inlet of the evaporator, and includes first and second condition-responsive electric sensors positioned to respond to conditions at selected location in the system. An electrical amplifier circuit connects the condition-responsive electrical sensors to the valve for regulating the opening and closing of the valve in response to differences in the conditions sensed by the sensors. The system includes a refrigerant-bleeding means capable of feeding refrigerant to at least one of the sensors to initiate modulation of the expansion valve.

In one embodiment, the electrical amplifier circuit includes means providing a minimum current output to the valve upon system start-up when the sensors sense the same temperature, sufficient to open the valve to provide the refrigerant bleed to initiate modulation of the valve.

In another embodiment, the refrigerant bleeding means is a small orifice in a bypass line between the high and low pressure sides of the system of sufficient size to provide a low flow rate to initiate valve modulation. In one embodiment, the bypass line includes a solenoid valve.

More particularly, the first and second electrical sensors are temperature-responsive, the first sensor being positioned to respond to the temperature of liquid refrigerant expanded to suction pressure, and the second sensor being positioned to respond to suction line sensible temperature. In one embodiment, the bypass line is connected to the low pressure side of the system downstream of the second sensor. The electrical amplifier circuit modulates the expansion valve in response to the differences in the temperatures sensed by the sensors. The refrigerant-bleeding means in the system feeds refrigerant at a low flow rate during start-up of the system until the sensors sense different temperatures to initiate valve modulation and control superheat.

In one embodiment, a bypass line is provided in the low pressure side of the system downstream of the expansion valve and across the evaporator, the bypass line providing a bleed of refrigerant at a low flow rate. The first temperature-responsive electrical sensor is located in temperature-responsive relation to the refrigerant in the bypass line.

In another embodiment, the first temperature-responsive electrical sensor is located in temperature-responsive relation to the refrigerant in the low pressure side of the system downstream of the expansion valve and upstream of the evaporator.

DESCRIPTION OF THE PREFERRED EMBODIMENT

It will be understood that the modulating, electrically-operated expansion valve utilized in the control system can be of the general type disclosed in U.S. Pat. No. 3,914,952, the disclosure of which is incorporated by reference. This expansion valve generally indicated by 10 may be of the type that is normally closed as illustrated in FIG. 1 or may be of the type that is normally open as is illustrated in FIG. 2.

Figure 1:
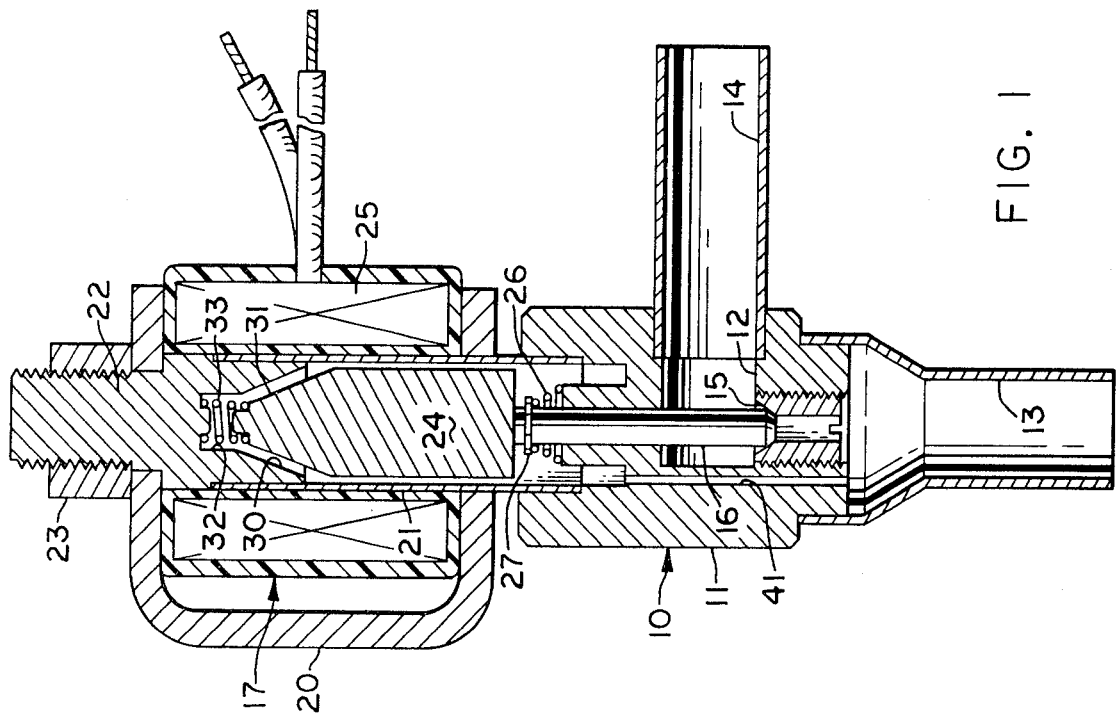
FIG. 1 is a cross-sectional view of a modulating electrically-operated valve utilized in the refrigeration control system.
Figure 2:
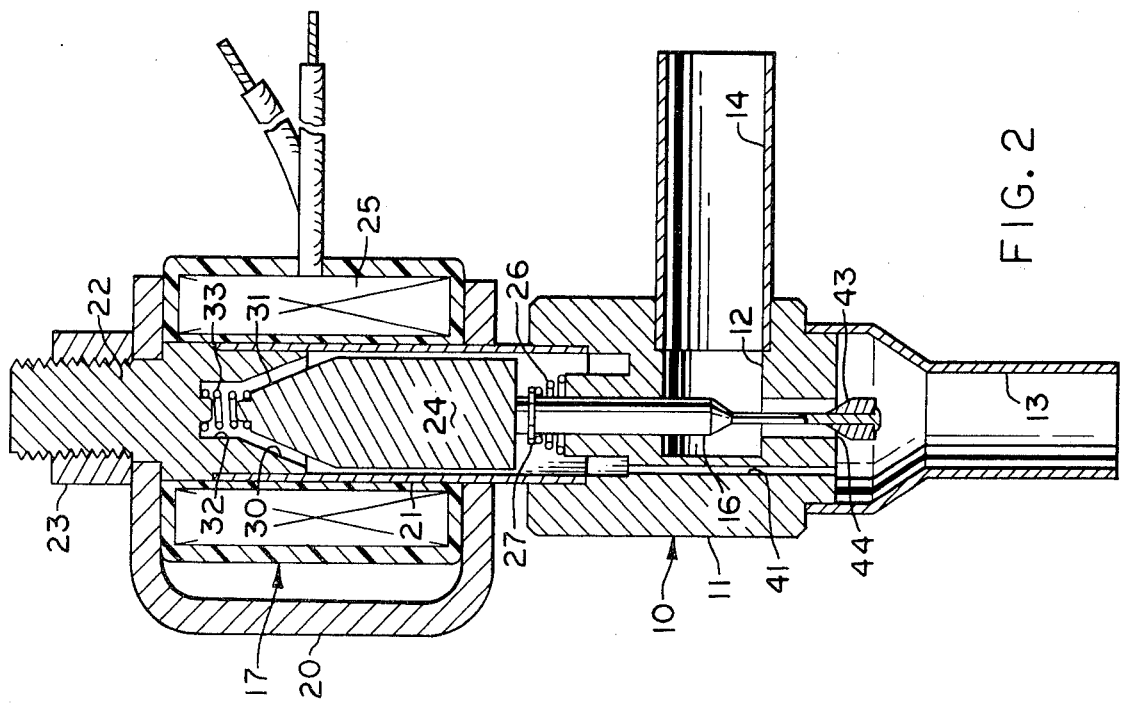
FIG. 2 is a cross-sectional view of another modulating electrically-operated valve utilized in the refrigeration control system.

Referring first to the expansion valve 10 of FIG. 1, the valve 10 includes a valve body 11 provided with an internal chamber 12. An inlet port 13 places chamber 12 in communication with the outlet of the condensor. An outlet port 14 places the chamber 12 in communication with the inlet of an evaporator. The valve body 11 includes a valve seat 15 in the chamber 12 between the inlet and outlet ports 13 and 14. A valve member 16 is reciprocatively mounted in the valve chamber 12 and cooperates with the valve seat 15 to control flow through the inlet and outlet ports 13 and 14.

A solenoid means generally indicated by 17 includes a housing 20 fixed to the valve body 11. A tubular sleeve 21 is carried by the housing 11 and is open at one end to receive the upper end of the valve member 16. A plug 22 is fixed to the housing 20 by nut 23, the plug 22 contacting and closing the other end of sleeve 21.

Reciprocatively mounted within the sleeve 21 is a plunger 24. Located within the housing 20 and located about the plug 22 and the plunger 24 is an electromagnetic coil 25. The housing 20, plug 22 and plunger 24 are made of ferrous material such as steel, while the sleeve is made of non-magnetic material, and affixed to the top plug 22, plunger 24, and a ferrous soft magnetic path provided by the housing 20 in the form of a yoke connecting the plug 22 and the outer diameter of the enclosing sleeve 21.

A compression spring 26 is located about the upper end of the valve member 16, one end of the spring 26 engaging the valve body 11 and the other end engaging a lock washer 27 fixed to the valve member 16. The spring 26 tends to hold the upper end of the valve member 16 against the lower end of the plunger 24.

The plug 22 and the plunger 24 are provided with opposed surfaces 30 and 31 with a magnetic gap therebetween, the opposed surfaces 30 and 31 having compatible, substantially conical shapes. The plug 22 is provided with a center recess 32 that receives a spring 33. The spring 33 tends to urge the plunger 24 in a direction away from the plug 22.

Figure 3:
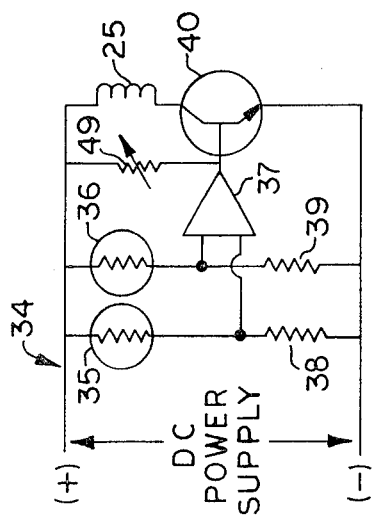
FIG. 3 is a circuit diagram of an electrical amplifier circuit utilized in the control system.

An electrical amplifier circuit generally indicated by 34 in FIG. 3 is connected to the coil 25, the circuit including a pair of condition-responsive sensors 35 and 36 for regulating opening and closing of the valve 10 in response to differences in the conditions sensed by the sensors 35 and 36. In the preferred embodiment, the sensors 35 and 36 are positive temperature coefficient resistive elements. The difference in sensor resistance is measured by the circuit with an error-detecting bridge and amplifier 37, and compared to a superheat setting that is determined by appropriate selection of the resistance value of resistors 38 and 39 and of sensors 35 and 36. For convenience, one of the resistors 38 and 39 may be variable to select the predetermined superheat setting. The resistors 38 and 39, in series with sensors 35 and 36 respectively, cooperate with the sensors 35 and 36 to provide voltage dividers for input to the amplifier 37 where the voltages are compared. It will be understood that, a variation in sensor resistance produces a corresponding variation in voltage applied to the amplifier 37.

The amplifier circuit of FIG. 3 is connected to a DC power supply and modulates the DC power to the solenoid coil 25 in response to the difference in the resistance of the sensors 35 and 36. The solenoid coil 25 is in series circuit with the transistor 40 which modulates the current flow to the primary circuit to vary the position of the valve member 16.

The included angle of the conical opposed surfaces 30 and 31 of the plug 22 and plunger 24 is selected so that the magnetic field moves the plunger 24 with a substantially linear action in response to changes in the magnetic field and with sufficient force for positive opening and closing of the valve member 16. Optimum operation is obtained with an included angle of 45°. Satisfactory operation has been achieved with an inclined angle within the range of about 30° to about 60°.

The spring 33 is selected to have force characteristics that substantially approximate the force characteristics of the magnetic field at the magnetic gap between conical surfaces 30 and 31 so that the plunger movement is substantially linearly proportional to the change in direct current.

It will be understood that the valve member 16 is pressure-balanced in that the same pressure is exerted on opposite sides of the valve member 16 as permitted by the passage 41 formed in the valve body 11.

The structure of the normally open valve 10 in FIG. 2 is substantially identical to the normally closed valve 10 of FIG. 1, and accordingly, the corresponding parts will be given identical reference numerals. The primary difference resides in the construction of the valve member 16 to provide a conical-shaped surface 43 on its lower end adapted to cooperate with a valve seat 44. The upper spring 33 tends to urge the valve member surface 43 away from the valve seat 44 so that when electrical power is turned off, the valve 10 will be wide open. This action provides rapid pressure equalization between the high and low sides of the refrigeration system.

The electrical amplifier circuit 34 in FIG. 3 is reversed in mode for the normally open valve of FIG. 2 as compared to the mode shown for the normally closed valve of FIG. 1.

Figure 5:
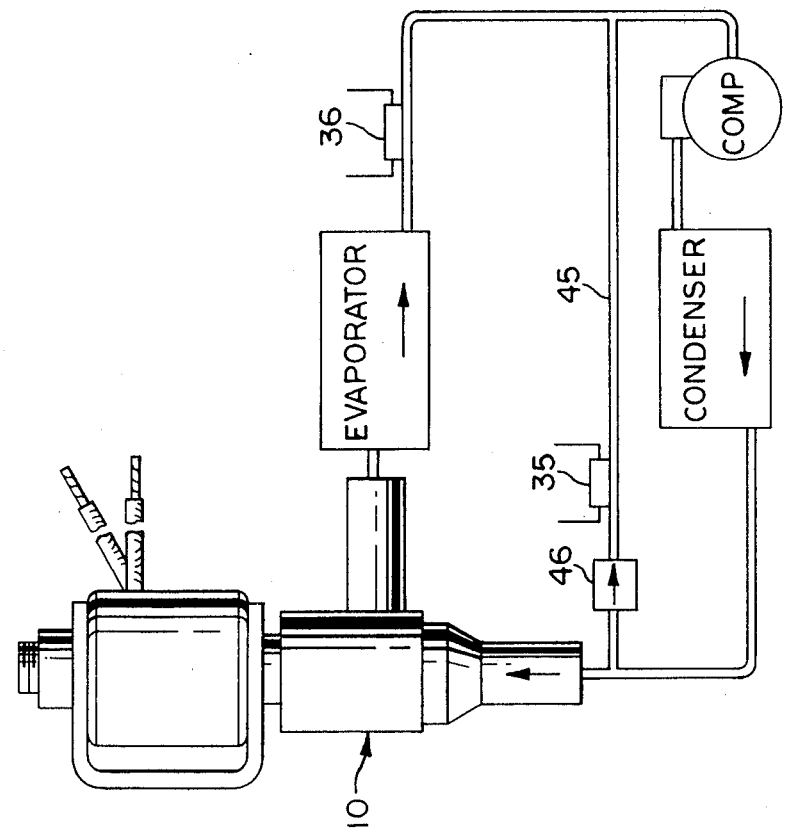
FIG. 5 is a refrigeration control system.

In the refrigeration system of FIG. 5, the modulating electrically-operated expansion valve 10 is utilized to control superheat. Superheat is the degrees above the boiling temperature at whatever pressure exists in the suction line. For exact superheat sensing, the suction temperature and suction pressure must be measured. These measurements are accomplished by placing sensor 35 in a system location where it can measure the temperature of liquid refrigerant expanded to suction pressure, and by placing the other temperature-responsive sensor 36 on the suction line to measure suction line sensible temperature. The sensor 35 which measures the boiling temperature of the liquid refrigerant expanded to suction pressure, typically called the "saturation" temperature, can be located at any point in the system where liquid can be caused to exist at suction pressure.

Figure 8:
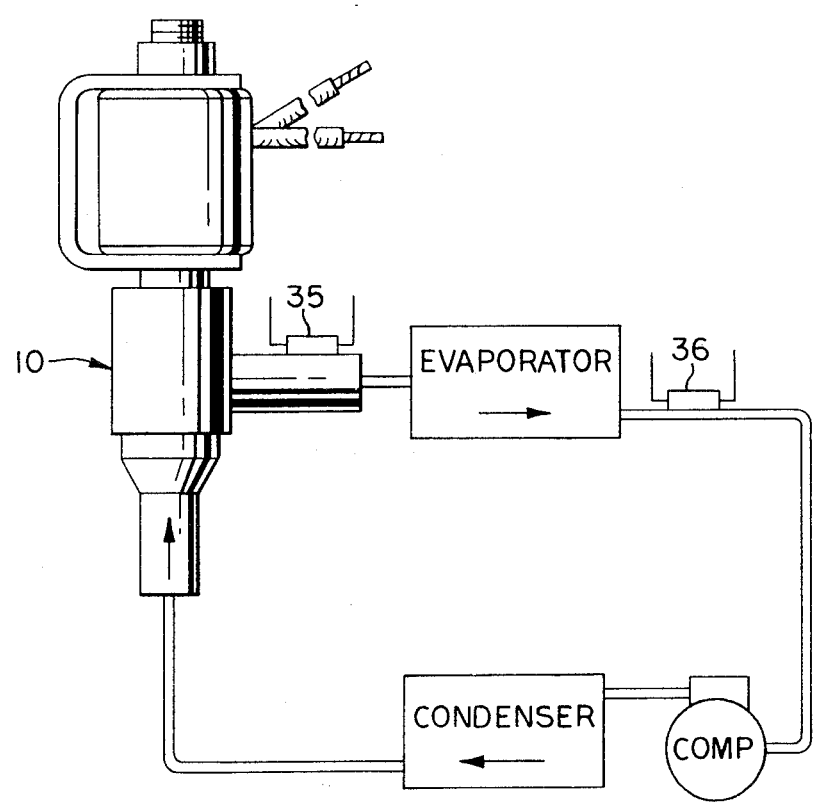
FIG. 8 is another refrigeration control system.

In one system the sensor 35 can be located on a bypass line 45 just downstream of a fixed expansion orifice 46 as is illustrated by FIG. 5. The bypass line 45 can come off of any point in the refrigeration system where liquid refrigerant or partial liquid refrigerant can be obtained. In another system illustrated in FIG. 8, the sensor 35 can be located between the expansion valve 10 and the evaporator such as at the expansion valve outlet. In each case, the sensor 35 is effectively picking up the saturation temperature of suction pressure of the bleed flow.

If the sensors 35 and 36 indicate superheat more than the circuit superheat setting, the valve 10 will modulate to a more open position to provide more refrigerant flow. If superheat is below the superheat setting, the valve 10 will modulate to a more closed position.

One of the unique problems encountered in sensing superheat using two temperature-responsive sensors, is that, at system start-up the circuit sees the fact that both sensors are at the same temperature, a condition which would usually indicate to the circuit the existence of excessively low superheat, and therefore, the circuit keeps the expansion valve closed. For example, when there is a zero temperature difference between the evaporator and suction line, there is an indication of flooding, and therefore feeding of the evaporator is not desired, and accordingly the valve wants to stay closed. However, upon start-up of the system, the same symptom is obtained, only it means that refrigerant is not being fed by the valve. In order to make the expansion valve work and get the system started, special conditions must exist in the starting mode.

To overcome this problem, a refrigerant-bleeding means is provided in the system that bleeds liquid refrigerant in the line where the sensor 35 is positioned. This refrigerant bleed can be through a fixed bleed orifice 46 in a bypass line 45 in systems of FIGS. 5 and 6 which connects to the low pressure side of the system downstream of the second sensor 36 or by supplying sufficient power to the electrically-operated expansion valve at the time of start-up to provide a low flow rate, in order to initiate modulation of expansion valve 10. As soon as the sensor 35 becomes colder than sensor 36, the circuit 34 (FIG. 3) detects a superheat condition that is above the superheat setting of the circuit and opens the expansion valve 10 to compensate.

In one embodiment, the electrical amplifier circuit of FIG. 3 includes means constituted by variable resistor 49 providing a minimum current output to the expansion valve 10 when the sensors 35 and 36 sense the same temperature upon system start-up sufficient to open the valve 10 to provide a refrigerant bleed in order to initiate valve modulation. The variable resistor 49 operatively connected to the power supply and the base of the transistor 40 is selectively adjusted to bias the transistor 40 to provide the minimum current to the valve 10 to provide the refrigerant bleed. It will be understood that the resistor 49 is only provided in circuits 34 and 47 (later described in detail) when the valve 10 is to be modulated to provide a refrigerant bleeding means. In refrigeration control systems such as illustrated in FIG. 5, the use of resistor 49 is optional.

Figure 6:
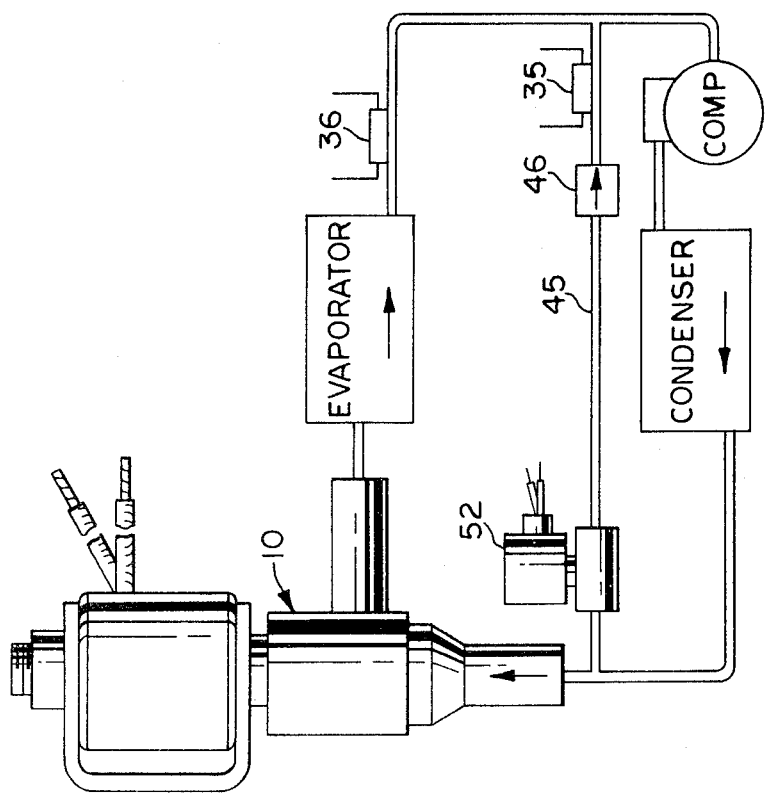
FIG. 6 is another refrigeration control system.

In embodiments of FIGS. 5 and 6, the refrigerant-bleeding means is a small orifice 46 in a bypass line 45 between the high and low pressure sides of the system. Again, it will be understood that in each instance, the sensor 35 is picking up the saturation temperature of suction pressure of the bleed flow.

Figure 4:
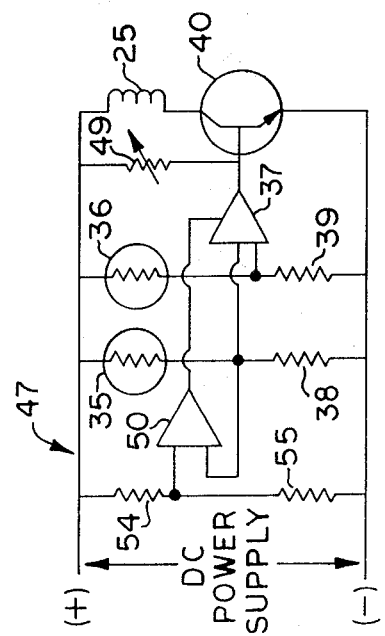
FIG. 4 is a circuit diagram of a modified amplifier circuit utilized in the control system.

FIG. 4 illustrates an electrical amplifier circuit 47 similar to the circuit 34 of FIG. 3 except that an additional amplifier 50 has been added to detect whether the suction saturation temperature exceeds a maximum value setting, which corresponds to a maximum operating pressure. The amplifier 50 compares the output of the first sensor 35 with a fixed bias value. A voltage divider circuit formed by resistors 54 and 55 provide the fixed bias value. The values of the resistors 54 and 55 are selectively determined to provide for the maximum value setting. One of the resistors 54 and 55 may be variable to facilitate this setting. If it does detect this condition, the amplifier 50 controls the amplifier 37 to cause the expansion valve 10 to close and thereby limit the suction saturation temperature on start-up and limit compressor motor start-up load.

By use of a normally closed valve 10 shown in FIG. 1, the electrically-operated expansion valve 10 can be made to function as a shut-off valve when power to the circuit is turned off. This allows the electric expansion valve 10 to replace the liquid line solenoid valve often used in "pumpdown" refrigeration systems.

The refrigeration system of FIG. 6 is similar to that of FIG. 5, however a solenoid operate shut-off valve 52 is included in the bleed line 45 to shut-off the bleed line 45. The shut-off valve 52 can be used in conjunction with the normally closed valve 10 of FIG. 1 in "pumpdown" refrigeration systems. The power to solenoid valve 52 is switched on and off with power to the amplifier circuit 34 or 47.

By use of a normally open valve 10 shown in FIG. 2, the electrically-operated expansion valve can provide rapid pressure equalization between the high side and low side of the system when power to the circuit is off. This allows the use of low torque compressor motors which require very low differential pressures at start-up.

Figure 7:
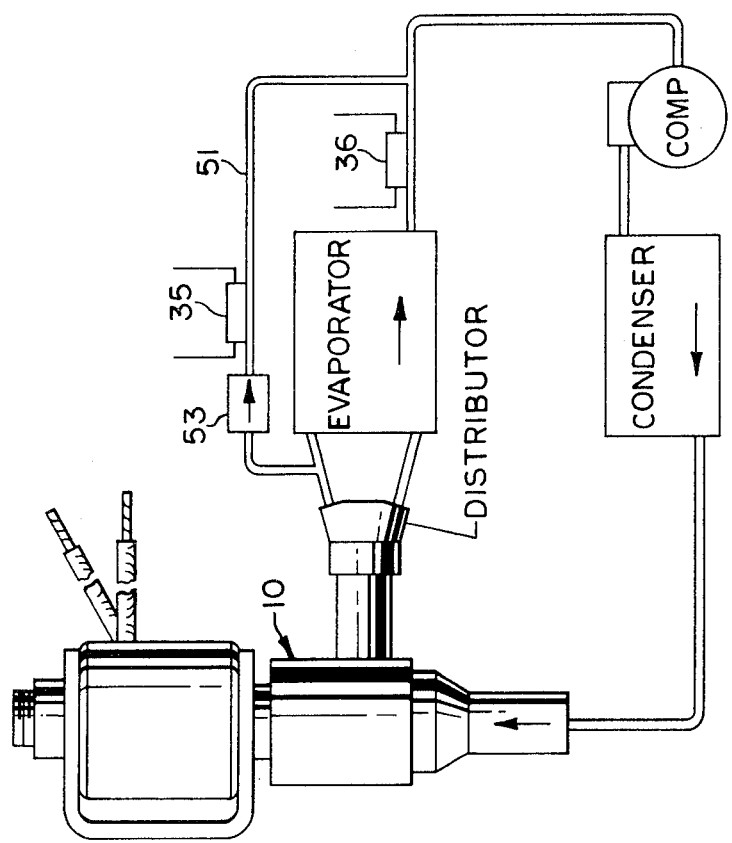
FIG. 7 is another refrigeration control system.

The refrigeration system of FIG. 7 illustrates a unique form of reading saturation temperature. In this system, the refrigerant is fed through the expansion valve 10 through a distributor into the evaporator. A bypass line 51 is provided in the low pressure side of the system downstream of the valve 10, and across the evaporator to connect to the suction line downstream of the sensor 36. In the preferred embodiment, the bypass line 51 is connected to the distributor. The bypass line 51 provides a bleed of refrigerant at a low flow rate which may be controlled by the provision of a fixed orifice 53. The sensor 35 is located in temperature-responsive relation to the refrigerant in the bypass line 51. The refrigerant flows through the bypass line 51, causing the sensor 35 to sense true saturation temperature. It will be understood that in this system, there must be provided a refrigerant-bleeding means for feeding refrigerant to the evaporator at a low flow rate during start-up of the system until the sensors 35 and 36 sense the different temperatures, in order to initiate modulation of the valve to control superheat. This refrigerant-bleeding means is provided by the means in the electrical amplifier circuit 34 (FIG. 3) or 47 (FIG. 4) providing a minimum current output to the valve 10 upon system start-up in the manner previously described.

I claim as my invention:

1. In a refrigeration system including a compressor, a condensor, and an evaporator operatively connected, the system comprising:
   (a) a modulating, electrically operated expansion valve connected to the inlet of the evaporator,
   (b) first and second temperature-responsive electrical sensors, the first sensor being positioned to respond to the temperature of liquid refrigerant expanded to suction pressure, and the second sensor being positioned to respond to suction line sensible temperature,
   (c) an electrical amplifier circuit connecting the sensors to the valve for modulation of the opening and closing of the valve in response to the differences in the temperatures sensed by the sensors,
   (d) refrigerant-bleeding means in the system feeding refrigerant at a low flow rate when the first and second sensors sense the same temperature as during start-up of the system, the bleed flow causing the sensors to sense different temperatures to cause modulation of the valve to control superheat, the first sensor being positioned to respond to the saturation temperature of the suction pressure of the bleed flow, and
   (e) the electrical amplifier circuit including means providing a minimum current output to the valve sufficient to open the valve to provide the refrigerant bleed to initiate modulation of the valve.

2. The refrigeration system as defined in claim 1, in which:
   (f) the amplifier circuit means provides the minimum current output to the valve upon system start-up when the first and second sensors sense the same temperature.

3. The refrigeration system as defined in claim 1, in which:
   (f) the electrical amplifier circuit includes a detector for determining whether the suction saturation temperature exceeds a maximum set point, and actuating the expansion valve to close and limit the suction saturation temperature on start-up and limit compressor motor start-up load.

4. The refrigeration system as defined in claim 1, in which:
   (f) the expansion valve is normally closed and functions as a shut-off valve when power to the circuit is turned off.

5. The refrigeration system as defined in claim 1, in which:
   (f) the expansion valve is normally open for rapid pressure equalization between the high side and low side of the system when power to the circuit is turned off, the valve closing to the start-up open position when power to the circuit is turned on.

6. The refrigeration system as defined in claim 1, in which:
   (f) a bypass line is provided in the low pressure side of the system, the bypass line having a first end connected downstream of the valve and upstream of the evaporator, and a second end connected downstream of the evaporator, the bypass line providing a bleed of refrigerant at a low flow rate, and
   (g) the first sensor is located in temperature-responsive relation to the refrigerant in the bypass line.

7. The refrigeration system as defined in claim 6, in which:
   (h) the bypass line second end is connected downstream of the second sensor.

8. The refrigeration system as defined in claim 6, in which:
   (h) a distributor is connected at the evaporator, the bypass line first end being connected to the distributor.

9. The refrigeration system as defined in claim 1, in which:
   (f) the first sensor is located in temperature-responsive relation to the refrigerant at the inlet of the evaporator.

* * * * *